(12) United States Patent
Blasko et al.

(10) Patent No.: US 8,629,637 B2
(45) Date of Patent: Jan. 14, 2014

(54) OPERATION OF A THREE-PHASE REGENERATIVE DRIVE FROM MIXED DC AND SINGLE PHASE AC POWER SOURCES

(75) Inventors: Vladimir Blasko, Avon, CT (US); Ismail Agirman, Southington, CT (US); Stella M. Oggianu, Farmington, CT (US); Robert K. Thornton, Coventry, CT (US)

(73) Assignee: Otis Elevator Company, Farmington, CT (US)

( * ) Notice: Subject to any disclaimer, the term of this patent is extended or adjusted under 35 U.S.C. 154(b) by 328 days.

(21) Appl. No.: 13/128,798

(22) PCT Filed: Nov. 21, 2008

(86) PCT No.: PCT/US2008/012992
§ 371 (c)(1),
(2), (4) Date: May 11, 2011

(87) PCT Pub. No.: WO2010/059141
PCT Pub. Date: May 27, 2010

(65) Prior Publication Data
US 2011/0247900 A1    Oct. 13, 2011

(51) Int. Cl.
H02J 1/12 (2006.01)
H02P 3/14 (2006.01)
(52) U.S. Cl.
CPC .................................. H02P 3/14 (2013.01)
USPC ............ 318/376; 318/811; 318/812; 318/441
(58) Field of Classification Search
CPC ........................................................ H02P 3/14
USPC .................. 318/376, 811–812, 441
See application file for complete search history.

(56) References Cited

U.S. PATENT DOCUMENTS

| 4,386,394 | A | * | 5/1983 | Kocher et al. | 363/20 |
| 4,666,020 | A | * | 5/1987 | Watanabe | 187/290 |
| 5,058,710 | A | * | 10/1991 | Iwasa | 187/290 |

(Continued)

FOREIGN PATENT DOCUMENTS

| CN | 1106175 A | 8/1995 |
| JP | 61248881 A | 11/1986 |

(Continued)

OTHER PUBLICATIONS

Official Search Report and Written Opinion of the Patent Cooperation Treaty Office on foreign counterpart Application No. PCT/US2008/012992, filed Nov. 21, 2008.

(Continued)

*Primary Examiner* — Bentsu Ro
*Assistant Examiner* — David Luo
(74) *Attorney, Agent, or Firm* — Kinney & Lange, P.A.

(57) ABSTRACT

A three-phase regenerative drive (20) is operated based upon power from a single-phase AC source (12) and power from a DC source (14). The single-phase AC input power and the DC input power are converted to DC voltage on a DC bus (24) by a three-phase converter (22). DC power is provided from the DC bus (24) to a three-phase inverter having outputs connected to a motor (34). A controller (44) controls operation of the three-phase converter (22) based upon contribution factors of the AC and DC sources (12, 14) during motoring and regeneration. The controller (44) also controls an AC component of current from the DC source to reduce ripple current on the DC bus (24).

20 Claims, 5 Drawing Sheets

(56) References Cited

U.S. PATENT DOCUMENTS

| | | | |
|---|---|---|---|
| 5,504,667 A * | 4/1996 | Tanaka et al. | 363/37 |
| 5,781,422 A | 7/1998 | Lavin et al. | |
| 6,225,791 B1 | 5/2001 | Fujii et al. | |
| 6,636,012 B2 | 10/2003 | Royak et al. | |
| 6,732,838 B1 | 5/2004 | Okada et al. | |
| 2004/0262996 A1 * | 12/2004 | Olsen et al. | 307/44 |

FOREIGN PATENT DOCUMENTS

| | | |
|---|---|---|
| JP | 63178789 A | 7/1988 |
| JP | 2001008459 A | 1/2001 |
| JP | 2001180878 A | 7/2001 |
| JP | 2006238520 A | 9/2006 |

OTHER PUBLICATIONS

State Intellectual Property Office of People's Republic China, First Office Action, Apr. 15, 2013, 4 pages.

State Intellectual Property Office of People's Republic China, Search Report, Apr. 17, 2013, 2 pages.

Japanese Patent Office, Office Action, Jul. 2, 2013, 3 pages.

* cited by examiner

OPERATION OF A THREE-PHASE REGENERATIVE DRIVE FROM MIXED DC AND SINGLE PHASE AC POWER SOURCES

BACKGROUND

The present invention generally relates to power control systems. In particular, the invention relates to operation of three-phase regenerative drives.

Three-phase regenerative drives are used in industry in applications where frequent acceleration or deceleration is required, or when masses subject to gravitation forces are moved. Examples of such applications include cranes and elevators. In these applications, a significant amount of energy that is in the motoring mode is stored in masses subjected to acceleration or gravitation forces. This stored energy is returned back during deceleration or movement coinciding with the direction of gravitational force. A regenerative drive typically includes a converter on the input or power utility side and an inverter on the motor side. Both the converter and inverter share a common DC bus. Power demand of the inverter is matched in the design of the regenerative drive by an appropriate power capability of the converter on the input side.

Regenerative drives have been introduced into elevator systems to operate the electric elevator hoist motor that moves an elevator car up or down through a hoistway. The power demands for operating elevators range from positive, in which externally generated power (such as from a power utility) is used, to negative, in which the load in the elevator drives the motor so it produces electricity as a generator. The use of the motor to produce electricity as a generator is commonly called regeneration. In conventional systems, if the regenerated energy is not provided to another component of the elevator system or returned to the utility grid, it is dissipated through a dynamic brake resistor or other load. In this configuration, all demand remains on the power utility to supply power to the elevator system, even during peak power conditions (e.g., when more than one motor starts simultaneously or during periods of high demand). Thus, components of the elevator system that deliver power from the power utility need to be sized to accommodate peak power demand, which may by more costly and require more space. Also, the regenerated energy that is dissipated is not used, thereby decreasing the efficiency of the power system. In addition, an elevator drive system is typically designed to operate over a specific input voltage range from a power supply. The components of the drive have voltage and current ratings that allow the drive to continuously operate while the power supply remains within the designated input voltage range.

Regenerative drives typically operate on a balanced three-phase power input. There are times, however, when a three-phase power input is not available. For example, during initial elevator system installation, a three-phase power supply to a building site may not be available. At best, only single phase power may be available during elevator system installation. There also may be situations in which single phase power is the only AC power that is available on a long term basis.

There is a need for being able to utilize a three-phase, regenerative drive machine even during elevator installation when three-phase power is not available. In addition, there are other situations where a three-phase regenerative drive would be useful even when three-phase power is not available. PCT patent application WO 2006/022725 addresses the need for being able to operate a three-phase regenerative drive using single phase power.

A single phase AC source will typically have a voltage level that is 1.73 to two times lower than the voltage level available from a three-phase balanced AC source and power is delivered only from one instead of 3 phases. As a result, a single phase AC source may not be able to provide the required power for normal operation of a regenerative drive. If the current drawn from a single phase AC source is increased to meet load demand due to the typically lower voltage and available from only one phase instead of three phases, the increased current may exceed the current capability of the input/converter side of the regenerative drive. Thus, a three-phase converter when operating from single phase system may not be capable of providing enough power to satisfy the normal operating requirements of the load (e.g., the elevator hoist motor).

SUMMARY

A three-phase regenerative drive includes a three-phase converter, a three-phase inverter, a DC bus connecting the converter and the inverter, and a controller that provided control signals to operate the three-phase converter and the three-phase inverter. In this invention 3 phase converter that is conventionally connected to the 3 phase source has input terminals connected to a source of single phase AC power and to a source of DC power. The controller controls operation of the converter based upon contribution factors representing respective current contributions for the single phase AC power source and the DC source. Depending on the contribution factors, the three-phase regenerative drive can operate using single phase AC power only, DC power only, or a combination of single phase AC power and DC power.

DETAILED DESCRIPTION

Figure 1:
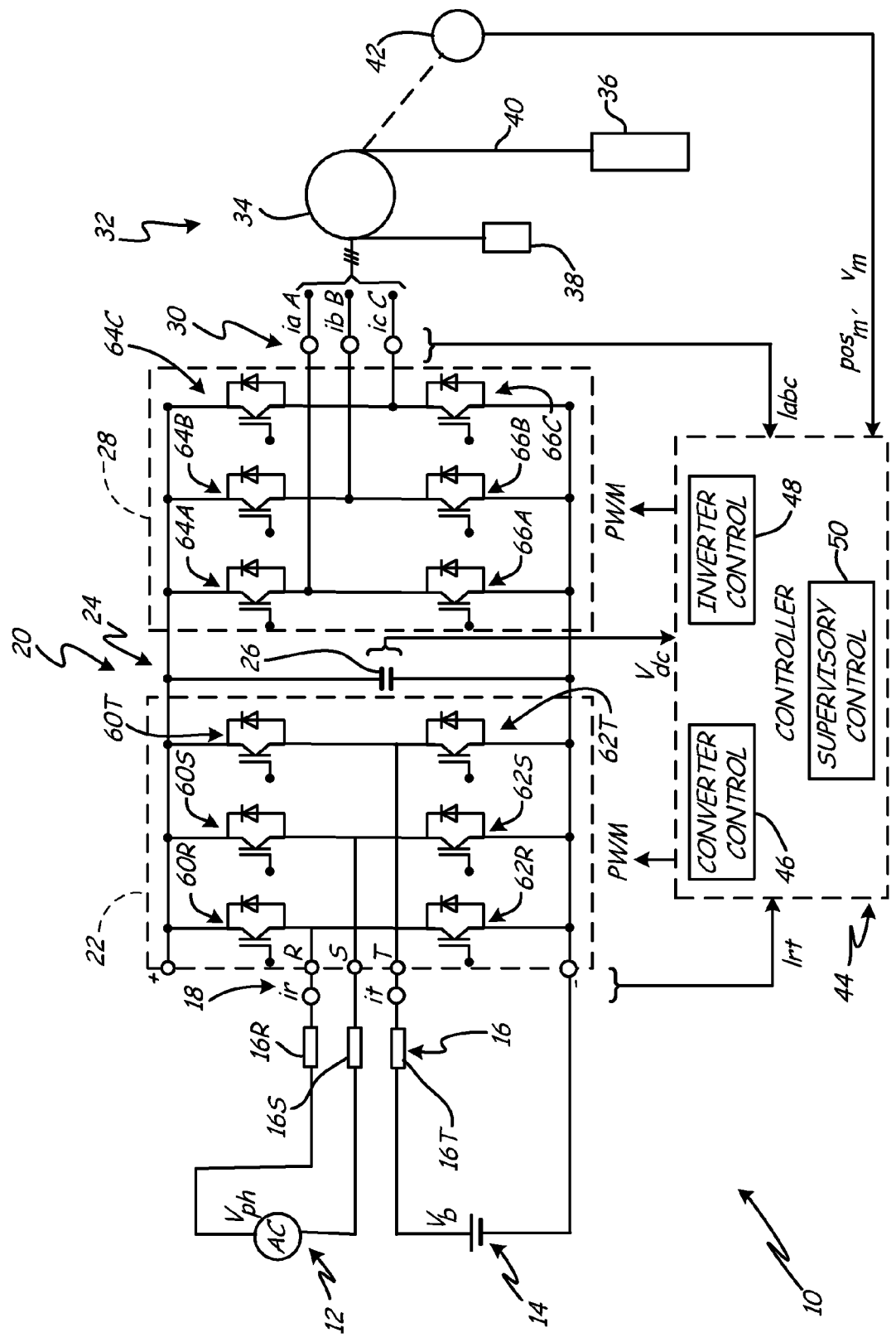
FIG. 1 is a schematic diagram of an elevator power system including a three-phase regenerative drive operable from mixed single phase AC and DC power sources.

FIG. 1 is a schematic diagram of power system 10, which includes single phase AC power source 12, DC power source 14, input line inductors 16R, 16S, 16T, input current sensors 18, regenerative drive 20 (which includes power converter 22, DC bus 24, smoothing capacitor 26, and power inverter 28), current sensors 30, elevator 32 (which includes hoist motor 34, elevator car 36, counterweight 38, roping 40 and motor position/speed sensor 42), and controller 44 (which includes converter control 46, inverter control 48, and supervisory control 50). Power system 10 operates elevator hoist motor 34 using a combination of single phase AC power from AC power source 12 and DC power from DC power source 14.

Controller 44 controls operation of power converter 22 and power inverter 28, and determines the relative contributions of current from AC power source 12 and DC power source 14 used to drive hoist motor 34. When motor 34 is regenerating electrical power, controller 44 controls converter 22 and inverter 24 so that regenerated power is delivered back to AC power source 12 and DC power source 14 according to relative contributions of current to be returned to the respective sources. The relative contributions during motoring and regeneration may be the same, or may differ. For example, DC power source 14 may receive a larger or smaller proportion of regenerated energy depending on its state of charge.

AC power source 12 represents, for example, single phase electrical power supplied from an electrical power utility grid. Single phase AC power is typically 1.73 to two times lower in voltage level than corresponding three-phase power. The total amount of power that can be delivered from single phase AC source 12 will be one-third of operable three-phase AC power, if it were available. Power system 10 provides the ability to operate three-phase regenerative drive 20 in situations where three-phase power from the utility power grid is not available, but single phase AC power, as well as DC power, is available.

DC power source 14 may include one or more devices capable of storing electrical energy that are connected in series or parallel. In some embodiments, DC power source 14 includes at least one supercapacitor, which may include symmetric or asymmetric supercapacitors. In other embodiments, DC power source 14 includes at least one secondary or rechargeable battery, which may include any of nickel-cadmium (NiCd), lead acid, nickel-metal hydride (NiMH), lithium ion (Li-ion), lithium ion polymer (Li-Poly), iron electrode, nickel-zinc, zinc/alkaline/manganese dioxide, zinc-bromine flow, vanadium flow, and sodium-sulfur batteries. In other embodiments, other types of electrical or mechanical devices, such as flywheels, can be used to store energy, which is then available from DC power source 14 as DC electrical energy. DC power source 14 may include one type of storage device or may include combinations of storage devices.

Single phase AC power source 12 is connected through inductors 16R and 16S to input terminals R and S of converter 22. The positive terminal of DC power source 14 is connected through inductor 16T to input terminal T of converter 22. The negative terminal of DC power source 14 is connected to the negative (−) terminal of converter 22.

Current sensors 18 sense current flow between AC power source 12 and power converter 22 and between DC power source 14 and power converter 22. The sensed current signals ($I_{rt}$) are provided to controller 44, where they are used by converter control 46 in controlling operation of power converter 22.

Power converter 22 is a three-phase bidirectional power converter that controls DC bus link voltage $V_{dc}$ and maintains it at a selected level by controlling active power/current flow into regenerative drive 20 from input lines connected to the R, S, and T input terminals. During regeneration, converter 22 controls voltage $V_{dc}$ on DC bus 24 by controlling flow of power from the R, S, and T terminals back to power sources 12 and 14. In the embodiment shown in FIG. 1, converter 22 includes a first power transistor circuit formed by power transistors 60R and 62R, a second circuit formed by power transistors 60S and 62S, and a third circuit formed by power transistors 60T, and 62T. Each power transistor 60R-60T and 62R-62T may be, for example, an insulated gate bipolar transistor (IGBT) with an associated diode. The controlled electrode (i.e., gate or base) of each power transistor 60R-60T and 62R-62T is connected to converter control 46.

Power transistor 60R is connected between the positive (+) terminal of power converter 22 and input terminal R of power converter 22. Power transistor 62R is connected between input terminal R and the negative (−) terminal.

Similarly, power transistor 60S is connected between the positive terminal and input terminal S. Power transistor 62S is connected between input terminal S and the negative terminal.

Together, power transistors 60R, 60S, 62R, and 62S form an AC-DC converter circuit for rectifying single phase AC power from AC power source 12 to DC voltage on DC bus 24. During regeneration, the circuit formed by transistors 60R, 60S, 62R, and 62S can be used to convert DC power from DC bus 24 to AC power that is supplied back to single phase AC power source 12 through terminals R and S.

Power transistors 60T and 62T form a DC-DC converter circuit for converting DC power from DC power source 14 to DC voltage on DC bus 24. Power transistor 60T is connected between the positive terminal and input terminal T, and power transistor 62T is connected between input terminal T and the negative terminal. During regeneration, the circuit formed by transistors 60T and 62T can be used to convert regenerated DC power from DC bus 24 to DC charging current for DC power source 14.

In one embodiment, converter control 46 employs pulse width modulation (PWM) to provide gating pulses to periodically switch transistors 60R-60T and 62R-62T in order to convert input power from AC source 12 and DC source 14 to DC power on DC bus 24. During regeneration, converter control 46 uses PWM gating pulses to control operation of converter 22 so that power from DC bus 24 is delivered back to AC power source 12, DC power source 14, or a combination of both.

Power inverter 28 is a three-phase power inverter that is operable to invert DC power from DC bus 24 to three-phase AC power delivered through terminals A, B, and C to hoist motor 34. Inverter 28 is capable of bidirectional operation, so that regenerated electrical power from motor 34 is received at terminals A, B, and C and is converted to DC power that is supplied to DC bus 24.

In the embodiment shown in FIG. 1, power inverter 28 includes a first power transistor circuit formed by power transistors 64A and 66A; a second circuit formed by power transistors 64B and 66B; and a third circuit formed by power transistors 64C and 66C. Each power transistor 64A-64C and 66A-66C may be an insulated gate bipolar transistor with an associated diode, as illustrated in FIG. 1. The controlled electrode of each transistor 64A-64C and 66A-66C is controlled by inverter control 48 to invert DC power on DC bus 24 to three-phase AC output power, or to rectify three-phase AC regenerated power to DC power that is supplied to DC bus 24. Inverter control 48 employs PWM gating pulses to periodically switch transistors 64A-64C and 66A-66C to provide the three-phase AC output power at terminals A, B, and C.

Current sensors 30 sense current flow from or to inverter 28 at terminals A, B, and C. The sensed current signals are supplied to controller 44, where they are used by inverter control 48 in controlling the operation of inverter 28. They may also be used to generate a feed forward control signal to converter control 46.

Hoist motor 34 controls the speed and direction of movement between elevator car 36 and counterweight 38. The power required to drive hoist motor 34 varies with the acceleration and direction of elevator car 36, as well as the load in elevator car 36. For example, if elevator car 36 is being accelerated, run up with a load greater than the weight of counterweight 38 (i.e., heavy load), or run down with a load less than the weight of counterweight 38 (i.e., light load), power is required to drive hoist motor 34. In this case, the power demand for hoist motor 34 is positive. If elevator car 36 runs down with a heavy load, or runs up with a light load, elevator car 36 drives hoist motor 34 and regenerates energy. In this case of negative power demand, hoist motor 34 generates AC power that is converted to DC power by power inverter 28 under the control of inverter control 48. As described above, the converted DC power may be returned to single phase AC power source 12, used to recharge DC power source 14, and/or dissipated in a dynamic brake resistor (not shown) connected across DC bus 24. If elevator 32 is leveling or running at a fixed speed with a balanced load, it may be using a lesser amount of power. If hoist motor 34 is neither motoring nor generating power, the power demand of hoist motor 34 is approximately zero.

It should be noted that while a single elevator 32 is shown connected to power system 10, power system 10 can be modified to power multiple elevators 32 and hoist motors 34. For example, a plurality of power inverters 28 may be connected in parallel across DC bus 24 to provide power to a plurality of hoist motors 34.

Sensor 42 is associated with hoist motor 34, and provides a position feedback signal $pos_m$ or a motor speed feedback signal $v_m$, or both, to controller 44. Supervisory control 50 controls the motion of elevator 32 by controlling the velocity of elevator 32 during an elevator trip. Supervisory control 50 may generate an elevator motion profile that defines maximum acceleration, maximum steady state speed, and maximum deceleration of motor 34. Based upon feedback values of motor position ($pos_m$), motor speed ($v_m$) and motor current (Iabc), supervisory control 50 provides signals to converter control 46 and inverter control 48 to regulate voltage on DC bus 24, and to control operation of inverter 28.

As described above, power converter 22 is a three-phase bidirectional power converter that is capable of converting three-phase AC power at terminals R, S, and T to DC power at DC bus 24. In FIG. 1, however, the three-phase AC source has been replaced by single phase source 12 and DC source 14. Before discussing operation of power system 10 based upon mixed operation from a combination of single phase AC source 12 and DC source 14, a brief review of operation of power converter 22 with balanced three-phase AC power and with only single phase AC power will be helpful.

Figure 2:
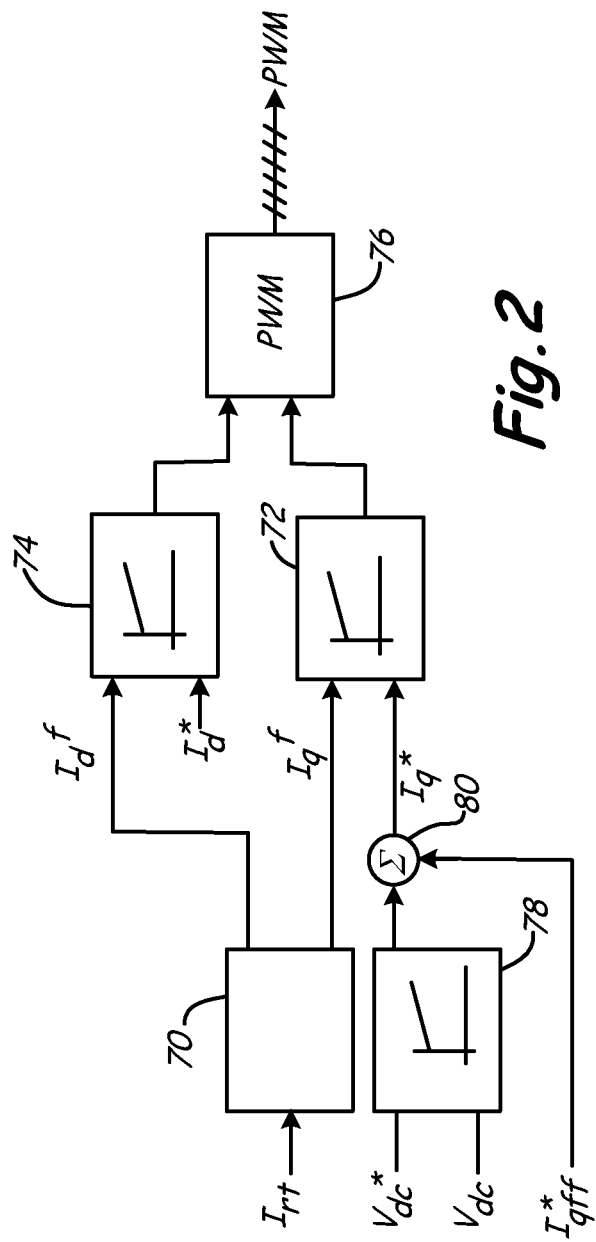
FIG. 2 is a block diagram illustrating a converter control for operating a three-phase converter using three-phase AC input power.

FIG. 2 shows the basic functions of converter control 46 in controlling power converter 22 when three-phase AC power is available at terminals R, S, and T. Converter control 46 provides pulse width modulation (PWM) control pulses to power converter 22 in order to control bus voltage $V_{dc}$ on power bus 24 at a selected level. This is achieved by controlling active power/current flow into regenerative drive 20. Active current $I_q$ is in phase with phase voltages, while reactive current $I_d$ lags phase voltages by 90 degrees electrical.

Converter control 46 receives current sensor signals $I_{rt}$ from current sensors 18. Current transformation block 70 converts sensor signals $I_{rt}$ into active current feedback signal $I_q^f$, and reactive current feedback signal $I_d^f$. Current regulation is performed by active current regulator 72 and reactive current regulator 74 in a two-phase synchronous frame of reference into which feedback currents have been transformed by current transformation 70 from the three-phase stationery reference frame (R, S, T). The outputs of current regulators 72 and 74 are provided to pulse width modulation pulse generator 76, which provides the PWM gating pulses to transistors 60R-60T and 62R-62T.

Reference current $I^*_q$ (demand for active power/current needed to maintain DC bus voltage) is generated by DC voltage regulator 78. In this case, an active current command is created as a consequence of error in DC bus voltage feedback. Voltage regulator 78 creates only correctional term $\Delta I^*_q$ in total active current reference $I^*_q$. To assist operation of DC bus voltage regulation, a feed forward command ($I^*_{qff}$) for current reference is created from known demand of load power. Feed forward command $I^*_{qff}$ may be provided by inverter control 48, and is summed with $\Delta I^*_q$ at summing junction 80 to produce reference current $I^*_q$.

Input power to three-phase regenerative converter $P_{3ph}$ is:

$$P_{3ph} = \sqrt{3} V_{ll} I PF \quad (1)$$

where $V_{ll}$ Is line to line voltage (typically 380V to 480V, and in some countries ~220V)

I Input line current

PF Power factor, often maintained to be ~1.

Three-phase input power is a product of three sinusoidal voltages and currents. For a balanced and non-distorted system, the power is constant at any instant for steady state conditions. Constant power flow into the regenerative drive under balanced conditions keeps constant voltage on DC bus 24 with just a DC component, and without any higher harmonics.

Operation of a three-phase power converter using single-phase AC input power is described in PCT application WO 2006/022725 by Agirman, Blasko and Czerwinski, which is incorporated by reference. In single-phase applications, the input power to the converter can be calculated from $$P_{1ph} = V_{ph} I PF \quad (2)$$

where $V_{ph}$ is line to ground or phase voltage (typically 220V).

For a three-phase regenerative drive powered by the single phase AC source (of for example, $V_{ph}$=220V instead of $V_{ll}$=380V) the power capability is reduced by factor of $$\frac{P_{1ph}}{P_{3ph}} = \frac{V_{ph} IPF}{\sqrt{3} V_{ll} IPF} = \frac{220}{\sqrt{3}\, 380} = \frac{1}{3}$$

meaning that when operated with a single-phase AC source, regenerative drive 20 can deliver only ⅓ of the power for which it was originally designed. Additionally, instantaneous value of power from a single-phase AC source assuming sinusoidal voltage and current and unity power factor is $$P_{1ph} = \sqrt{2} V_{ph} \sin(\omega t) = V_{ph} I (1 - \cos(2\omega t)) \quad (3)$$

From equation (3), it can be seen that the power delivered to DC bus 24 has a DC value corresponding to equation (2), superimposed with a second harmonic component. As the output power from the DC bus 24 is continuous (DC), the second current harmonic creates voltage ripple on smoothing capacitor 26. The consequences are potentially increased torque ripple on hoist motor 34 and additional loading of smoothing capacitor 26.

From the above, it is clear that a three-phase regenerative drive, when powered by single-phase AC input power, has two-fold disadvantage: reduced power delivery and increased voltage ripple on the DC bus smoothing capacitor.

To offset these drawbacks, DC source 14 is connected to input terminal T and the negative terminal of converter 22 of regenerative drive 20, as shown in FIG. 1. Input terminal T becomes available when single-phase AC source 12 is connected to in put terminals R and S. In this case, DC source 14 provides additional power and, with appropriate shaping of the current reference used to control converter 22, it reduces or eliminates voltage ripple on DC bus 24.

Figure 3:
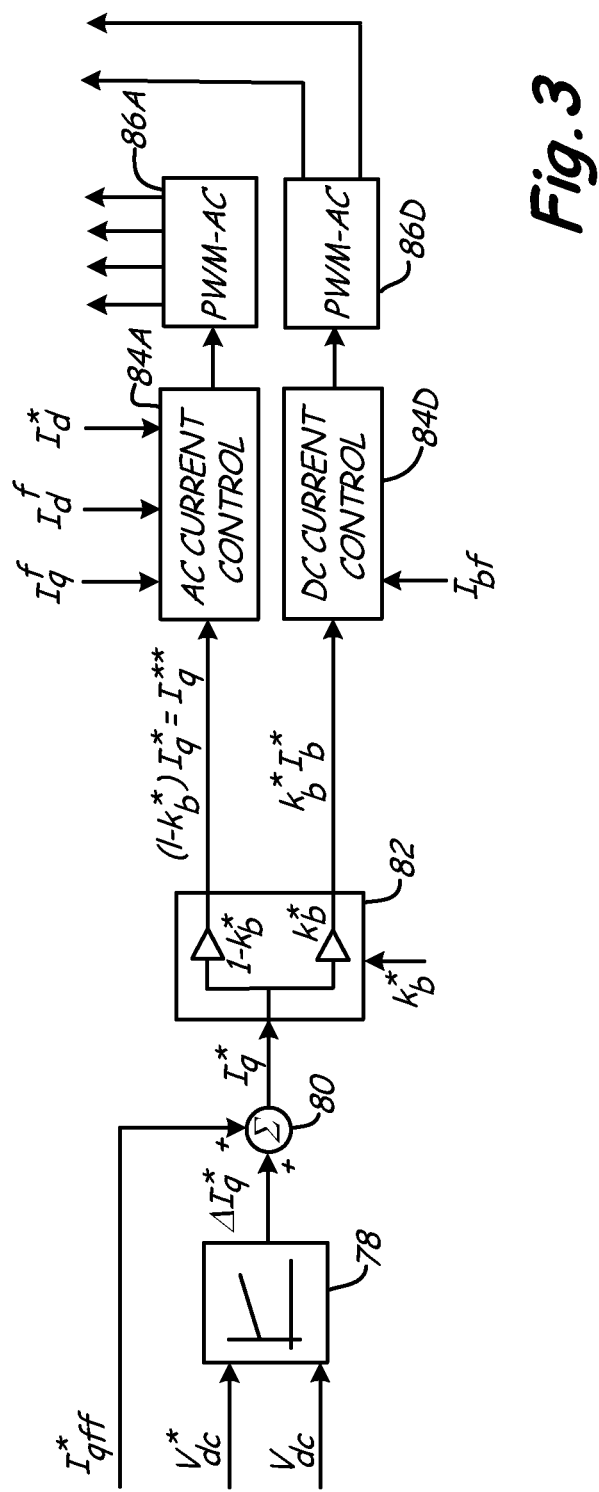
FIG. 3 is a block diagram illustrating a converter control for operating a three-phase converter using power from both single phase AC and DC power sources.

FIG. 3 shows a functional block diagram of converter control 46 using mixed AC and DC sources 12 and 14 with power sharing. In this example, a battery will be described as a typical example of DC source 14. Shown in FIG. 3 are voltage regulator 78, summer 80, reference splitter 82, AC current control 84A, DC current control 84D, PWM-AC pulse generator 86A, and PWM-DC pulse generator 86D.

Current reference $I^*_q$ is created in the same way as for the three-phase AC power case shown in FIG. 2 and is split into two parts: (a) single phase AC converter current reference $I^{}_q$ and (b) battery controller current reference $I^{}_b$. The factor $k_b \in \{k_b^g, k_b^m\}$ determines the relative contributions to the desired current reference $I^*_q$ by DC power source 14 and by single phase AC source 12 (superscript g stands for regeneration, subscript m for motoring, and subscript b for battery). The factor $k_b$ can assume values between 0 and 1. For $k^*_b=0$, only the single phase AC converter formed by transistors 60R, 60S, 62R, and 62S will control DC bus 24; there will be no contribution from DC source 14 and transistors 60T and 62T. For $k^*_b=0.5$, the current reference will be split equally between single phase AC source 12 and DC source 14. For $k^*_b=1$, DC power source 14 and transistors 60T and 62T will control voltage $V_{dc}$ on DC bus 24. Different values for load sharing factor $k^*_b=1$ can be selected during motoring and during regeneration, and additionally it can be varied depending on the level of charge in the battery.

AC current control 82 generates control signals used by PWM-AC pulse generator 86 to produce gating pulses to transistors 60R, 60S, 62R, and 62S. The control signals are a function of $I^{**}_q$, $I_q^f$, $I_d^f$, and $I^*_d$. As shown in FIG. 3, $I^{**}_q = (1-k^*_b)I^*_q$.

DC current control generates control signals used by PWM-DC pulse generator to produce gating pulses to transistors 60T and 62T. The control signals are a function of $k^*_b I^*_b$.

The average value of additional power from the DC source, $P_{b\_dc}$, is:

$$P_{b\_dc} = V_b I_b \quad (4)$$

The loading of the leg of converter 22 operating from DC source 14 (i.e., the circuit formed by transistors 60T and 62T) is a complex function of the ratio of the DC source voltage to the DC bus voltage, IGBT module design, free wheeling current rating, IGBT device rating, current direction, etc. The total converter power, Pc, is sum of power from AC source 12 and DC source 14:

$$P_c = P_{b\_dc} + P_{1ph} = I_b V_b + I V_{ph} \quad (5)$$

To reduce voltage ripple on DC bus 24, the instantaneous power from single phase AC source 12 ($P_{1ph}$) and DC source 14 ($P_{b\_dc}$), should be constant:

$$P_{1ph} + P_{b\_ac} = V_{ph} I (1 - \cos(2\omega t)) + P_{b\_ac} = V_{ph} I \quad (6)$$

Where $V_{ph}$ and I are RMS values of phase voltage and current. From Equation (6) it follows the AC power component from DC source should be:

$$P_{b\_ac} V_{ph} I \cos(2\omega t)) = V_b I_{b\_ac} \quad (7)$$

Or the AC component of current from the DC source should be:

$$I_{b\_ac} = \frac{V_{ph}}{V_b} I \cos(2\omega t) \quad (8)$$

This AC component can be provided by appropriate control of DC source 14.

Figure 4:
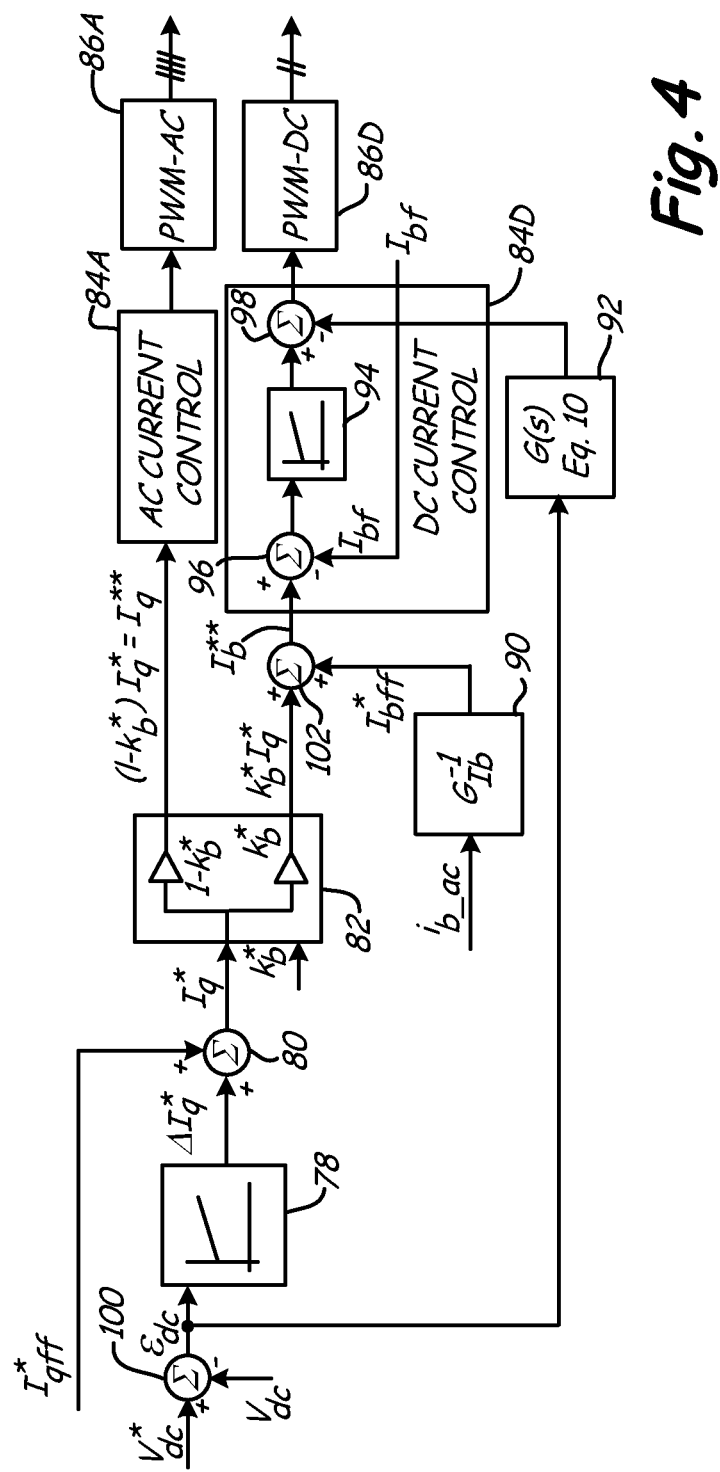
FIG. 4 is a block diagram of a three-phase converter control for mixed single phase AC and DC power sources in which DC bus voltage ripple is controlled by the DC power source current.

The addition of DC power source 14 together with power sharing between single phase AC power source 12 and DC power source 14 produces reduced voltage ripple on DC bus 24. FIG. 4 shows a functional block diagram similar to FIG. 3, but with the addition of feed forward component block 90 ripple regulator 92. Also shown in FIG. 4 are DC current regulator 94 and summers (or adders) 96 and 98 (which form DC source current control 84), summer (or adder) 100 (which produces error signal $\epsilon_{dc} = V^*_{dc} - V_{dc}$ that is an input to voltage regulator 78 and ripple regulator 92), and summer 102.

In FIG. 4, DC bus voltage ripple is controlled by the DC source current. The ripple is controlled/eliminated by a feed forward signal $I^*_{bff}$ that is added to the DC source current reference $k^*_b I^*_q$ at summer 102 to produce modified current reference $I^{}_b$ at the input of DC current control 84D. Modified current reference $I^{}_b$ is compared to feedback signal $I_{bf}$ by element—summer 96. The difference $I^{**}_b - I_{bf}$ is provided as an input to current regulator 94.

With negligible processing delay and high enough bandwidth of current regulator 94, the feed forward value of current $I^*_{bff}$ should supplement for "deeps" in AC power and should remove ripple from DC bus 24. Feed forward term $I^*_{bff}$ (which is proportional to $I_{b\_ac}$) is added to the DC source current reference $k^*_b I^*_q$ at summing junction 102. Feed forward term $I^*_{bff}$ is generated from $I_{b\_ac}$ after being passed through an inverse of the approximation of closed loop transfer function $G_{Ib}^{-1}$ for DC source current control.

DC bus voltage ripple is also controlled by DC bus voltage ripple regulator 92 in FIG. 4. The output of ripple regulator 92 is added to the output of current regulator 94 by adder/summer 98 to produce the control signal input to PWM-DC pulse generator 86D.

Ripple regulator 92 helps to remove AC components from the DC bus voltage by controlling an AC component in the DC bus voltage error signal $\epsilon_{dc}$. The error signal is fed into ripple regulator 92 of the type:

$$G(s) = K_p + \frac{K_i \omega_0}{s^2 + \omega_0^2} \quad (9)$$

$$G(s) \approx K_p + \frac{K_i \omega_0}{s^2 + 2\varsigma \omega_0 s + \omega_0^2} \text{ for small damping factor } \varsigma. \quad (10)$$

where $K_p$ and $K_i$ are regulator gains, $\omega_0 = 2\pi(2f_{util})$ is angular frequency of the ripple component of DC bus voltage (equal to 2 times the utility frequency). The output of DC bus voltage ripple regulator 92 is shown in Equation (10) and is subtracted from the output of current regulator 94 by adder/summer 98, as shown in FIG. 4.

When DC source 14 is a battery or supercapacitor, operation of regenerative drive 20 may also include control logic within controller 44 to maintain charge level on the battery or supercapacitor at a desired state-of-charge set point or target.

Figure 5:
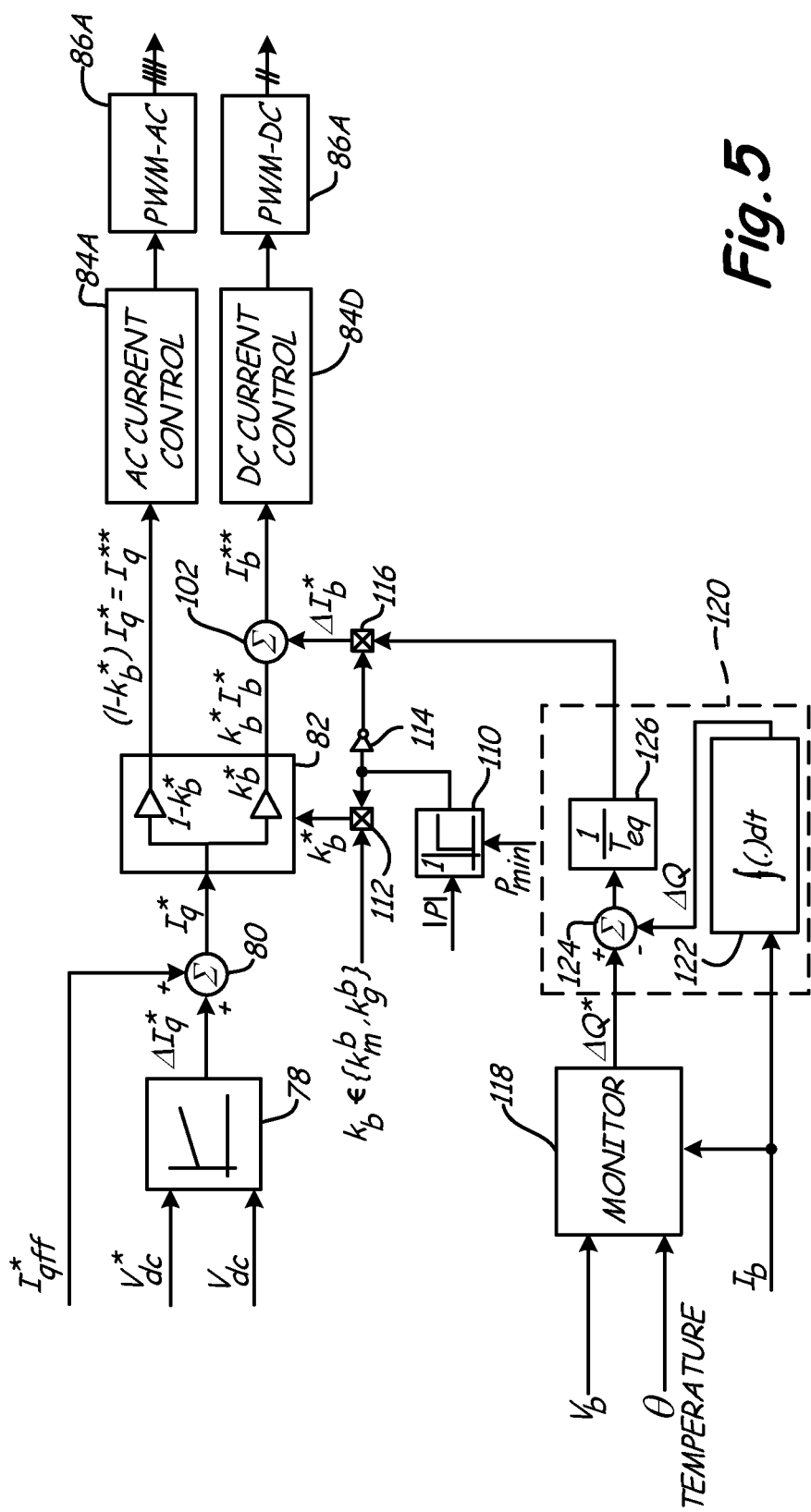
FIG. 5 is a block diagram showing a three-phase converter control for mixed single phase AC and DC power sources with charge balance control for a battery or supercapacitor used as the AC power source.

FIG. 5 is a functional block diagram of converter control 46 that is generally similar to the diagram shown in FIG. 3, but with the addition of power comparator 110, multiplier 112, inverter 114, multiplier 116, state-of-charge monitor 118, and charge balance control 120 (which includes current integrator 122, summer/adder 124, and time constant divider 126 acting as a proportional regulator). These additional components maintain charge level at the state-of-change target.

Power comparator 110 provides logic "1" at its output when absolute value power required by the load is higher than a preset minimal value otherwise it provides "0" at the output. In this case (high) power demand to maintain DC bus voltage will be shared between single phase AC source 12 and DC source 14. If required power is smaller than the preset minimal value, then output of comparator $k^*_b=0$, and consequently $k^*_b I^*_b=0$, and the DC bus voltage will be controlled by the energy from single phase AC source 12 only. This mode of operation when load demand is small will be used for charging/discharging the battery. Other indicators instead of power (e.g., speed) can be used in comparator 110.

Additionally, a new reference for the DC source current is generated to monitor level of charge in DC source 14 in order maintain it around reference level $\Delta Q^*$. For this purpose, DC source current $I_b$ is integrated at integrator 122 to produce $\Delta Q$, which is added with (−) sing by summer 124 to reference $\Delta Q^*$. Monitor 118 produces reference $\Delta Q^*$ based upon sensed battery voltage $V_b$, battery temperature θ and desired state of charge.

During the idling period of regenerative drive (i.e., small demand for the power on the load, or the output of power comparator 110 equals 0), charge balance control circuit 126 sets the reference for the DC source current and works toward charging/discharging, equalizing charge on DC source 14. The idling period depends on the application; for example, for an elevator, it happens during loading passengers between floors or during time when traffic is slow and there are no demands for motion. Time constant $T_{eq}$ and level of charge imbalance will set the charging/discharging current reference $\Delta I^*_b$, which is added to $k^*_b I^*_b$ by summer 102 to produce current reference $I^{**}_b$ for current control 84D. It means that charging/discharging current is increased with DC source 14 being more charged/discharged. The speed of the charge balancing depends on the time constant $T_{eq}$. For longer time constant, it will take more time for charge to balance, however, charging current will be smaller.

In another embodiment, the components of FIG. 4 that reduce DC bus voltage ripple are combined with the components of FIG. 5 that maintain DC source 14 at a state-of-charge target. The result is that converter control 46 controls converter 22 to increase power capacity through power sharing of AC source 12 and DC source 14, to reduce DC bus voltage ripple, and to maintain state-of-charge of DC source 14.

Powering a three-phase regenerative drive from a combination of a single phase AC source and a DC source expands the capability of a drive when compared to a regenerative drive powered by a single phase AC source alone. The power rating of the drive is increased by using both AC and DC sources, and provides a redundancy in case one of the sources of energy is lost or not available. For example, a loss of single phase AC power may still allow a regenerative drive to operate at a full or reduced performance level depending on the power demand of the load. Other approaches for dealing with loss or unavailability of three-phase AC power or the availability of only single phase power involve more expensive systems. For example, one possible solution to lack of three-phase AC power from the utility power grid involves the addition of an on-site three-phase power generator, such as diesel motor/generator set as an alternative source of three-phase power to the utility power grid. Other approaches involve connecting a high voltage DC source directly to the regenerative drive, or connecting a lower voltage DC source with a separate DC/DC converter to provide all of the power for the regenerative drive. These solutions also involve additional cost. In another approach, the input power converter of the regenerative drive could be redesigned to be able to handle the much higher currents needed from a single phase source in order to provide high enough power to operate the regenerative drive. This also requires providing a single phase feeder with high enough power to meet the power demands of the regenerative drive. Once again, this represents a more expensive approach than the mixed single-phase AC and DC power sources used in power system 10.

As illustrated in FIGS. 3-5, converter control 46 splits the current reference from the DC bus voltage regulator into two parts. One part is used for controlling current from and to single-phase AC source 12. The other is used for controlling current from and to the DC source 14. By using a contribution or sharing factor $k_b$, a ratio of power from DC source 14 to total power demand is defined. The factor $k_b$ can be selected as a function of capability of AC source 12 or DC source 14 and associated power electronic devices, the mode of operation (e.g., generation, idling, or motoring), the level or state of charge of the DC power source, traffic profiles, seasonal or hourly utility rates, and so on. The selection of factor $K_b$ may be made, for example, by supervisory control 50 and provided to converter control 46.

The use of power from DC source 14 in conjunction with power from single-phase AC source 12 provides opportunities to reduce voltage ripple on DC bus 24. The reductions in ripple are achieved by several different aspects. First, providing additional power from DC source 14 tends to reduce voltage ripple. Second, the current reference that controls current from DC source 14 can by shaped to augment lapses in power flow from single-phase AC source 12. Third, using a signal containing the DC bus voltage ripple and providing it to a ripple regulator allows adjustment of the AC component in DC source current to reduce or eliminate ripple from DC bus voltage. Fourth, the control of the current to and from DC source 14 can also take into account a state-of-charge target for DC source 14.

Although the present invention has been described with reference to preferred embodiments, workers skilled in the art will recognize that changes may be made in form and detail without departing from the spirit and scope of the invention.

The invention claimed is:

1. A three-phase regenerative drive comprising:
    a three-phase converter having inputs for connection to a single-phase AC source and a DC source;
    a three-phase inverter for connection to a motor;
    a DC bus connected between an output of the three-phase converter and an input of the three-phase inverter; and
    a controller for providing control signals to the three-phase converter to control respective contributions to current demand by the single-phase AC source and the DC source.

2. The three-phase regenerative drive of claim 1, wherein the three-phase converter comprises:
    a first circuit comprising a first set of power transistors for controlling current flow between the single-phase AC source and the DC bus; and
    a second circuit comprising a second set of power transistors for controlling current flow between the DC source and the DC bus.

3. The three-phase regenerative drive of claim 2, wherein the control signals include a first set of pulse width modulation (PWM) signals to control the first set of power transistors and a second set of pulse width modulation (PWM) signals to control the second set of power transistors.

4. The three-phase regenerative drive of claim 3, wherein the controller comprises:
a voltage regulator for producing a current reference as a function of DC bus voltage and a reference voltage;
a reference splitter for splitting the current reference into a first reference associated with the single-phase AC source and a second reference associated with the DC source;
an AC current control for generating an AC current control signal based on the first reference;
a first PWM generator for generating the first set of PWM signals as a function of the AC current control signal;
a DC current control for generating a DC current control signal based on the second reference; and
a second PWM generator for generating the second set of PWM signals as a function of the DC current control signal.

5. The three-phase regenerative drive of claim 4 and further comprising:
a current sensor for producing a feedback signal as a function of sensed current flow between the DC source and the DC bus; and
wherein the DC current control generates the DC current control signal based upon the second reference and the feedback signal.

6. The three-phase regenerative drive of claim 5 wherein the controller further comprises:
a ripple regulator for producing a ripple correction signal as a function of DC bus voltage ripple; and
wherein the DC current control generates the DC current control signal based upon the second reference, the feedback signal, and the ripple correction signal.

7. The three-phase regenerative drive of claim 4 and further comprising:
a circuit for producing a feed forward signal as a function of an AC component of current flow from the DC source; and
a signal combiner for modifying the second reference based upon the feed forward signal.

8. The three-phase regenerative drive of claim 4 and further comprising:
a state-of-charge control for providing a charge control signal based upon state-of-charge of the DC source and current flow between the DC source and the DC bus; and
a signal combiner for modifying the second reference based upon the charge control signal.

9. The three-phase regenerative drive of claim 4 wherein the reference splitter splits the current reference based upon a contribution factor.

10. The three-phase regenerative drive of claim 9 wherein the contribution factor is selectable as a function of mode of operation of the three-phase regenerative drive.

11. The three-phase regenerative drive of claim 9 wherein the contribution factor is selectable as a function of at least one of capability of the single-phase AC source, capability of the DC source, capability of components of the three-phase converter and the three-phase inverter, state-of-charge of the DC source, elevator traffic profiles, and utility rates.

12. A method of operative a regenerative drive comprising a converter, an inverter and a DC bus connected between the converter and the inverter, the method comprising:
connecting a single-phase AC source and a DC source to the converter;
creating a current reference as a function of DC bus voltage;
splitting the current reference into a first reference and a second reference;
controlling current flow in the converter between the single-phase AC source and the DC bus as a function of the first reference; and
controlling current flow in the converter between the DC source and the DC bus as a function of the second reference.

13. The method of claim 12 wherein splitting the current reference is based upon a contribution factor.

14. The method of claim 13 wherein the contribution factor is a function of whether the regenerative drive is in a motoring mode, an idle mode, or a regeneration mode.

15. The method of claim 13 wherein the contribution factor is selectable based upon at least one of capability of the single-phase AC source, capability of the DC source, capability of components of the converter and inverter, state-of-charge of the DC source, and utility rates.

16. The method of claim 12 and further comprising:
producing a ripple correction signal as a function of DC bus voltage ripple; and
modifying current flow between the DC source and the DC bus based on the ripple correction signal.

17. The method of claim 12 and further comprising:
producing a feed forward signal as a function of an AC component of current flow from the DC source; and
modifying the second reference based upon the feed forward signal.

18. The method of claim 12 and further comprising:
producing a charge control signal as a function of state of charge of the DC source: and
modifying the second reference based upon the charge control signal.

19. The method of claim 12 and further comprising:
determining power demand on the regenerative drive; and
splitting the current reference so that the first reference is equal to the current reference and the second reference is zero when the power demand is less than a threshold value.

20. The method of claim 12 wherein the inverter is connected to an elevator hoist motor.

* * * * *